US011250354B2

(12) United States Patent
Koshy et al.

(10) Patent No.: US 11,250,354 B2
(45) Date of Patent: Feb. 15, 2022

(54) SYSTEM AND METHOD FOR DYNAMICALLY UPDATING A TRAVEL ITINERARY

(71) Applicant: IBS Software FZ-LLC, Dubai (AE)

(72) Inventors: Asish Zachariah Koshy, Kerala (IN); Archana Chacko, Kerala (IN); Vishnu Ram, Kerala (IN)

(73) Assignee: IBS Software FZ-LLC, Dubai (AE)

( * ) Notice: Subject to any disclaimer, the term of this patent is extended or adjusted under 35 U.S.C. 154(b) by 305 days.

(21) Appl. No.: 16/556,328

(22) Filed: Aug. 30, 2019

(65) Prior Publication Data
US 2021/0065075 A1  Mar. 4, 2021

(51) Int. Cl.
*G06Q 10/02* (2012.01)
*G06Q 50/14* (2012.01)
*G06Q 30/06* (2012.01)
*G06F 40/295* (2020.01)

(52) U.S. Cl.
CPC ......... *G06Q 10/025* (2013.01); *G06F 40/295* (2020.01); *G06Q 30/0643* (2013.01); *G06Q 50/14* (2013.01)

(58) Field of Classification Search
CPC .. G06Q 10/02–10/025; G06Q 30/0641; G06Q 30/0643; G06Q 50/14
See application file for complete search history.

(56) References Cited

U.S. PATENT DOCUMENTS

| 2009/0216633 | A1* | 8/2009 | Whitsett | G06Q 30/02 705/14.36 |
| 2013/0268195 | A1* | 10/2013 | Tai | G01C 21/343 701/533 |
| 2014/0236647 | A1 | 8/2014 | Wettan | |
| 2015/0294239 | A1 | 10/2015 | Araya Hernandez | |
| 2015/0356471 | A1 | 12/2015 | Shaw et al. | |

(Continued)

FOREIGN PATENT DOCUMENTS

WO  2017160276 A1  9/2017

OTHER PUBLICATIONS

Mokhov, et al., A UI Design Case Study and a Prototype of a Travel Search Engine, Concordia University, Montreal, Canada, 2003 (Year: 2003).*

(Continued)

*Primary Examiner* — Daniel Vetter

(57) ABSTRACT

A system and method for dynamically updating a travel itinerary are described herein. The system 101 receives, user inputs for selecting items. The system 101 creates electronic carts based on the user inputs. Each electronic cart is associated with an unique identifier. Each electronic cart comprises items. The system 101 invokes, a rendering module for positioning the electronic carts on a GUI based on user defined time and date. The system 101 generates one or more events. Each event comprises items associated with electronic carts. The system 101 displays events on the GUI using the rendering module. The system 101 enables a user to perform a task selected from a group of tasks based on the unique identifiers associated with electronic carts. Further, the system 101 dynamically updates one or more items associated with the at least one electronic cart based on impact of the task.

19 Claims, 11 Drawing Sheets

(56) References Cited

U.S. PATENT DOCUMENTS

| | | | |
|---|---|---|---|
| 2016/0155206 A1* | 6/2016 | Eijdenberg | G06Q 10/109 705/5 |
| 2017/0045365 A1 | 2/2017 | Paz-Tal | |
| 2021/0223944 A1* | 7/2021 | Lee | G06F 3/0482 |

OTHER PUBLICATIONS

Masoodian, et al., A Comparison of Linear and Calendar Travel Itinerary Visualizations for Personal Digital Assistants, Proceedings of OZCHI 2004, The CHISIG Annual Conference on Human-Computer Interaction, Wollongong, Australia, Nov. 20-24, 2004 (Year: 2004).*

* cited by examiner

SYSTEM AND METHOD FOR DYNAMICALLY UPDATING A TRAVEL ITINERARY

TECHNICAL FIELD

The present subject matter described herein, in general, relates to a data processing and data mining techniques. In particular, the present subject matter is related to a system and method for dynamically updating a travel itinerary.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Trip planners have been widely used in the travel industry. Previously, booking of travel itineraries were performed manually by going to travel agents and manually selecting the plans from the available plans. The growth of the Internet, the proliferation of geospatial data, and the development of information technologies generally has led to the rapid development of many self-service browser-based travel itinerary planners.

Currently, when a passenger approaches a travel agency with a request to put together an entire vacation experience, the agency has to rely on different booking systems and then painstakingly combine all the individual product bookings on a single itinerary, resulting in severe loss of productivity. This is also time consuming and may lead to increased possibility of errors. Furthermore, the existing systems face a limitation of storing and revising one or more planned events in a non-complex way.

Thus, there is a long standing need of a system and method for dynamically updating a travel itinerary which provides the travel agents with not only the ability to book all types of travel products from one platform, but also design the entire itinerary in highly productive manner. There is a need of a system and method which provides ease in iterations of events by creation of subsets of each previously planned event and each revised event. Thus, there is a need of a system and method which may facilitate in easy retrieval and modification of each revised event, based on previously created events, thereby reducing load on the processor of the system.

SUMMARY

This summary is provided to introduce concepts related to a system and method for dynamically updating a travel itinerary. This summary is not intended to identify essential features of the claimed subject matter nor is it intended for use in determining or limiting the scope of the claimed subject matter.

In one implementation, a system for dynamically updating a travel itinerary is disclosed. The system may comprise a processor and a memory coupled with the processor, wherein the processor is configured to execute a plurality of programmed instructions stored in the memory. The system may execute instruction for receiving, raw user inputs, wherein the raw user inputs are in a structured form or an unstructured form. The system may execute instruction for selecting, a subset of items from a set of items, based on the raw user inputs, when the raw user inputs are in the structured form. The system may execute instruction for creating, one or more electronic carts, wherein each cart is created based on one or more items from the subset of items, wherein each electronic cart is associated with a unique identifier, and wherein each electronic cart comprises the one or more items. The system may execute instruction for invoking, a rendering module for positioning the one or more electronic carts on a Graphical User Interface (GUI). The system may execute instruction for generating, a travel itinerary, wherein the travel itinerary comprises at least one electronic cart selected from the one or more electronic carts. The system may execute instruction for displaying, the travel itinerary on the Graphical User Interface using the rendering module, wherein one or more items associated with the at least one electronic cart is positioned on the GUI based on time and date associated with each item in the at least one electronic cart. The system may execute instruction for enabling, a user to perform a task, selected from a group of tasks, on a target item associated with the travel itinerary based on the unique identifiers associated with one or more electronic carts. The system may execute instruction for determining, impact of the task on each item of the at least one electronic cart. The system may execute instruction for dynamically, updating one or more items associated with the at least one electronic cart based on impact of the task.

In another implementation, a method for dynamically updating the travel itinerary is disclosed. The method may comprise receiving, raw user inputs, wherein the raw user inputs are in a structured form or an unstructured form. The method may comprise selecting, a subset of items from a set of items, based on the raw user inputs, when the raw user inputs are in the structured form. The method may comprise creating, one or more electronic carts, wherein each cart is created based on one or more items from the subset of items, wherein each electronic cart is associated with a unique identifier, and wherein each electronic cart comprises the one or more items. The method may comprise invoking, a rendering module for positioning the one or more electronic carts on a Graphical User Interface (GUI). The method may comprise generating, a travel itinerary, wherein the travel itinerary comprises at least one electronic cart selected from the one or more electronic carts. The method may comprise displaying, the travel itinerary on the Graphical User Interface using the rendering module, wherein one or more items associated with the at least one electronic cart is positioned on the GUI based on time and date associated with each item in the at least one electronic cart. The method may comprise enabling, a user to perform a task, selected from a group of tasks, on a target item associated with the travel itinerary based on the unique identifiers associated with one or more electronic carts. The method may comprise determining, impact of the task on each item of the at least one electronic cart. The method may comprise dynamically, updating one or more items associated with the at least one electronic cart based on impact of the task. In this implementation, the aforementioned method steps may be performed by a processor by executing instructions stored in a memory coupled with the processor.

In yet another implementation, a non-transitory computer readable medium storing program for dynamically updating a travel itinerary is disclosed. The program may comprise programmed instructions for receiving raw user inputs, wherein the raw user inputs are in a structured form or an unstructured form. Further, the program may comprise programmed instructions for selecting a subset of items from a set of items based on the raw user inputs, when the raw user inputs are in the structured form. The program may further comprise programmed instructions for creating one or more electronic carts, wherein each cart is created based on one or more items from the subset of items, wherein each electronic cart is associated with a unique identifier, and wherein each electronic cart comprises the one or more items. Further, the program may comprise programmed instructions for invoking a rendering module for positioning the one or more electronic carts on a Graphical User Interface (GUI). The program may further comprise programmed instructions for generating a travel itinerary, wherein the travel itinerary comprises at least one electronic cart selected from the one or more electronic carts. Further, the program may further comprise programmed instructions for displaying the travel itinerary on the Graphical User Interface using the rendering module, wherein one or more items associated with the at least one electronic cart is positioned on the GUI based on time and date associated with each item in the at least one electronic cart. The program may further comprise programmed instructions for enabling a user to perform a task, selected from a group of tasks, on a target item associated with the travel itinerary based on the unique identifiers associated with one or more electronic carts. Further, the program may comprise programmed instructions for determining impact of the task on each item of the at least one electronic cart. Furthermore, the program may comprise programmed instructions for dynamically updating one or more items associated with the at least one electronic cart based on impact of the task.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
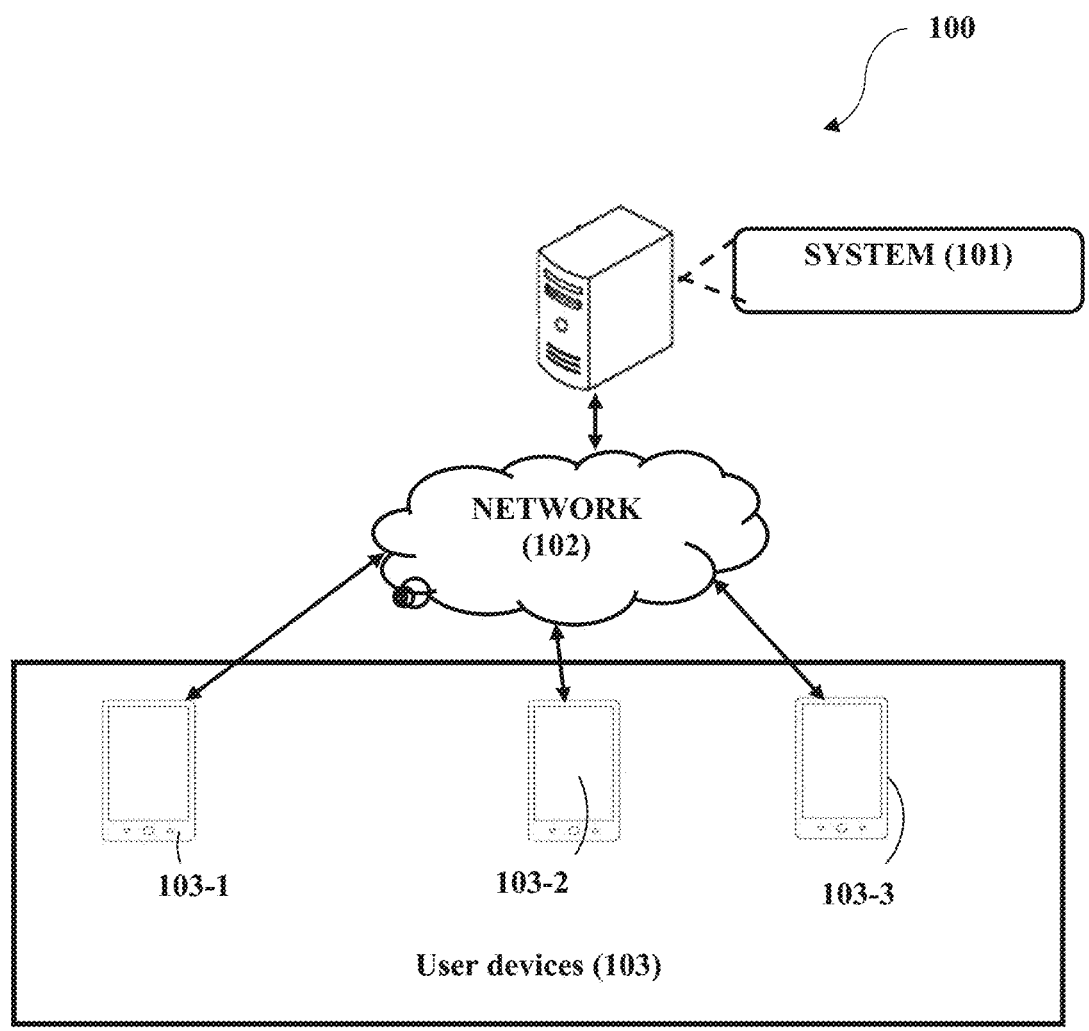
FIG. 1 illustrates, a network implementation 100 of a system 101 for dynamically updating a travel itinerary, in accordance with an embodiment of a present subject matter.

FIG. 1 illustrates a network implementation 100 of a system 101 for dynamically updating a travel itinerary, in accordance with an embodiment of a present subject matter. In one embodiment, the system 101 may be implemented as a server (hereinafter the system 101 is interchangeably referred as server 101). In an embodiment, the server 101 may be connected to a user device 103 over a network 102. It may be understood that the server 101 may be accessed by multiple users through one or more user devices 103-1,103-2,103-3 . . . 103-n, collectively referred to as user device 103 hereinafter, or user 103, or applications residing on the user device 103. The user 103 may be any person, machine, software, automated computer program, a robot or a combination thereof.

In an embodiment, though the present subject matter is explained considering that the system 101 is implemented as a server, it may be understood that the system 101 may also be implemented in a variety of user devices, such as a but are not limited to, a portable computer, a personal digital assistant, a handheld device, a mobile, a laptop computer, a desktop computer, a notebook, a workstation, a mainframe computer, and the like. In one embodiment, the system 101 may be implemented in a cloud-computing environment and the business services follow micro service architecture model. In an embodiment, the network 102 may be a wireless network, a wired network or a combination thereof. The network 102 can be accessed by the user device 103 using wired or wireless network connectivity means including updated communications technology.

In one implementation, the network 102 may be a wireless network, a wired network or a combination thereof. The network 102 can be accessed by the device using wired or wireless network connectivity means including updated communications technology.

In one implementation, the network 102 may be a wireless network, a wired network or a combination thereof. The network 102 can be implemented as one of the different types of networks, cellular communication network, local area network (LAN), wide area network (WAN), the internet, and the like. The network 102 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 102 may include a variety of network devices, including routers, bridges, servers, computing devices, storage devices, and the like.

In one embodiment, the system 101 may facilitate one or more travel itineraries to be stored as an electronic cart entity in the system 101. Each electronic cart may have a corresponding unique identifier that may be retrieved and plotted on a Graphical User Interface, herein after referred as GUI. Thus, the system 101 avoids creating different versions of one or more travel itineraries, instead of that, the system 101 may create different electronic carts for different travel itineraries.

In one embodiment, the system 101 may facilitate either search for an individual product availability or search for a pre-defined package which comprises of all required products through the application search user interface. The system 101 may enable the user 104 to add the required products or package into the electronic cart and once the products or packages are added into the electronic carts, the system 101 may launch the view of GUI from a display screen of the electronic carts. Finally, the user 103 may be able to see the overview in the travel itineraries on the GUI and further the system 101 may enable the user 103 to perform modification tasks that may be visible on the GUI.

Figure 2:
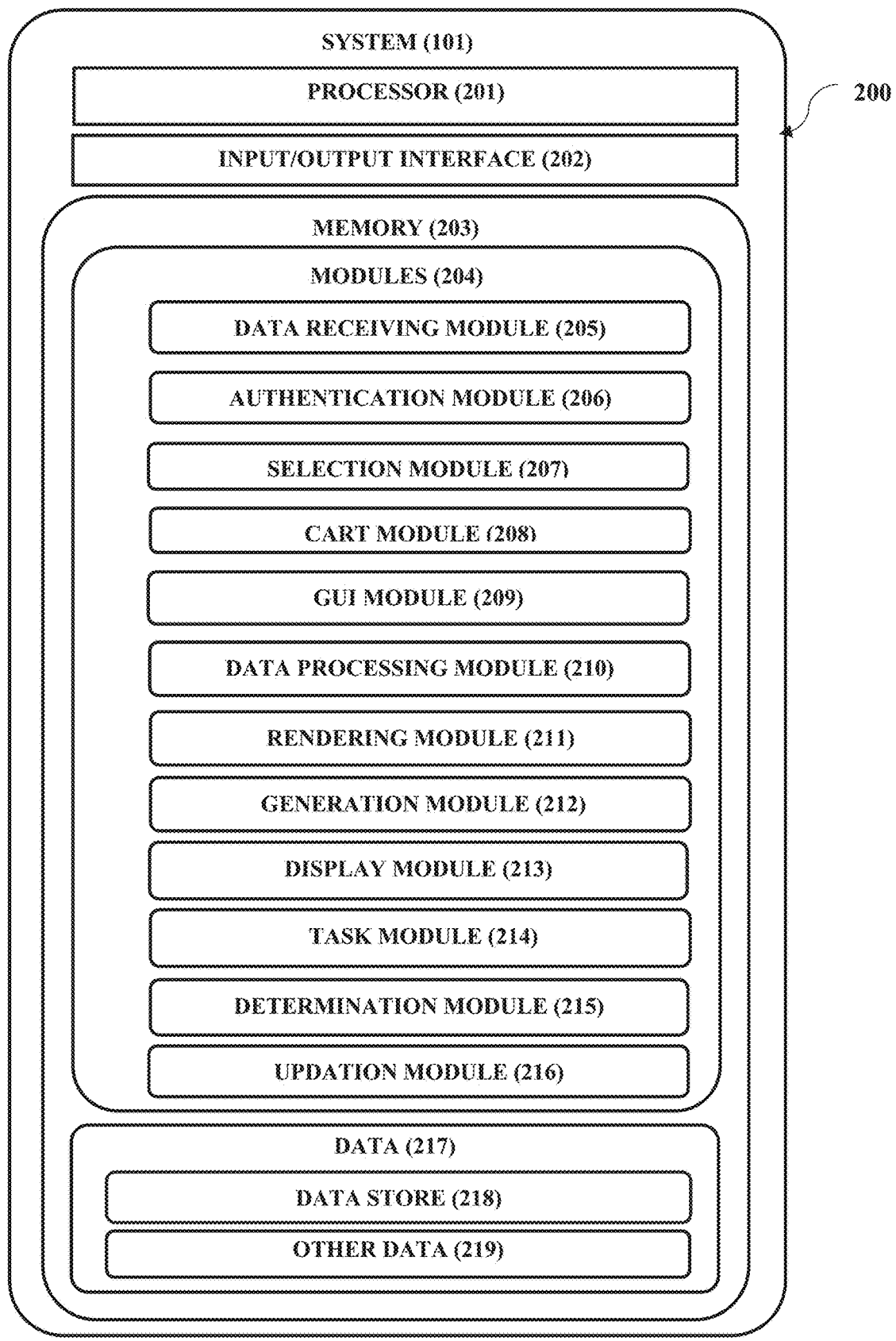
FIG. 2 illustrates, the system 101 and its components, in accordance with an embodiment of a present subject matter.

Referring to FIG. 2, components of the system 101, comprises at least one processor 201, an input/output (I/O) interface 202, modules 203, modules 204 and data 216. In one embodiment, at least one processor 201 is configured to fetch and execute computer-readable instructions stored in the memory 203.

In one embodiment, the I/O interface 202 implemented as a mobile application or a web-based application may include a variety of software and hardware interfaces, for example, a web interface, a graphical user interface, and the like. The I/O interface 202 may allow the system 101 to interact with the user devices 103. Further, the I/O interface 202 may enable the user device 103 to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting to another server.

In an exemplary embodiment, the I/O interface 202 is an interaction platform which may provide a connection between users 103 and system 101.

In an implementation, the memory 203 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory 203 may include modules 204 and data 217.

In one embodiment, the modules 204 include routines, programs, objects, components, data structures, etc., which perform particular tasks, functions or implement particular abstract data types. In one implementation, the modules 204 may include a data receiving module 205, an authentication module 206, a selection module 207, a cart module 208, a GUI module 209, a data processing module 210, a rendering module 211, a generation module 212, a display module 213, a task module 214, a determination module 215, and an updation module 216. The data 217 may further comprise a data store 218 and other data 219.

In one embodiment, the data receiving module 205 may receive data. The data may be based on activity performed by the user. In one embodiment, raw inputs may be received from the user. The raw user inputs may be in a structured or an unstructured from. In one embodiment, the activity performed by the user may include, but are not limited to, enrolment to a certain program, purchasing a product, travelling, etc. In one embodiment, there may be multiple activities available In one embodiment, the authentication module 206, may authenticate the user data. The data received by the data receiving module 205, regarding the personal details, enrollment or such data of the user, may be authenticated and authorised by the system 101. This provides enhanced security to the system 101. The users who are authenticated by the authentication module can only have access to the system 101.

In one embodiment, the selection module 207 may select a subset of items from a set of items. The selection may be based on raw user inputs. In one embodiment, the raw inputs may be in structured form. The structured form may comprise selection of the subset of items from the items defined by the system 101. In one embodiment, the items may be related to travel itinerary such as journey routes, means for travelling, lodging and boarding details, site seeing details, and the like. The relevant data of the items may be stored in the data store 218.

In one embodiment, the cart module 208 may create electronic carts. In one embodiment, the cart module 207 may be configured to create one or more electronic carts based one or more items from the subset of items. Each electronic cart is associated with an unique identifier. The unique identifier may enable easy identification of the electronic cart by the user and the system 101. Each electronic cart comprises one or more items. In one embodiment, the electronic cart may be a virtual electronic cart which may enable the user to add required items in the electronic cart. In one embodiment, said electronic cart may include items along with stipulated date and timings by the user. In one embodiment, the unique identifier may comprise but may not be limited to an alpha numeric format or value. In one embodiment, the unique identifier may be randomly generated, thereby providing security for created electronic carts.

In one embodiment, the GUI module 209 may be a Graphical Interface Module, wherein the GUI module 208 may be configured to invoke a Graphical User Interface (GUI) on a user device 103. The GUI on the user device 103 may enable the user to view a visual way of interacting with a system 101 using virtual objects such as windows, icons, and menus.

In one embodiment, the data processing module 210, may convert one or more electronic carts into a rendering module 211. Furthermore, the data processing module 210 may process all type of data required for conversion of the electronic carts. Furthermore, the data processing module 210 may also perform data abstraction. In one embodiment, the data processing module 210 may be configured to process the data offline or in the form of server-side data processing.

In one embodiment, the data processing module 210 may also facilitate orchestration of data. In one embodiment, the orchestration of data may facilitate user interaction with the system 101. In other words, the conversion of one or more APIs (Application Programming Interface) of the user selected items into corresponding API's of the system 101 may be facilitated by the data processing module 210.

In one embodiment, the rendering module 211 may be invoked for positioning one or more electronic carts on the Graphical User Interface (GUI). In one embodiment, the rendering module 210 may comprise one or more formats for displaying the time and date on the Graphical User Interface, wherein one or more formats may comprise a calendar view or such like formats.

In one embodiment, the generation module 212 may generate a travel itinerary. The travel itinerary may comprise at least one electronic carts selected from the one or more electronic carts.

In one embodiment, the display module 213 may display the travel itinerary on the GUI using the rendering module 210. The displayed travel itinerary on the GUI may enable the user to view the travel itinerary based on time and date associated with each item in the at least one electronic cart. One or more items associated with the at least one electronic cart is positioned on the GUI based on time and date. In a preferred embodiment, the system 101 may enable the user to view an entire finalized journey plan on the GUI based on user defined time and date/s.

In one embodiment, the task module 214 may enable the user to perform a task selected from a group of tasks. The task may be performed on a target item associated with the travel itinerary based on the unique identifiers associated with one or more electronic carts. In one embodiment, the group of tasks may comprise modification of electronic carts using the unique identifiers to identify the corresponding electronic cart. In one embodiment, the group of tasks may comprise modifying, deleting, replacing, adding, or storing one or more items in the electronic cart based on performed activities or inputs. In another embodiment, group of tasks may also comprise combining or separating two or more electronic carts. In a preferred embodiment, the task module 213 may be configured to modify the electronic carts by adding, deleting, storing, replacing one or more items such as means for travelling, destinations, routes, hotels and such like in order to create or modify the journey plans. The user 103 may be enabled to modify the electronic the carts using the alpha numeric codes or values, or formats associated with each electronic cart, thereby reducing the load or burden on the processor 201 and providing ease in performing the group of tasks. The modified journey plans may then be displayed on the GUI and the system 101 may enable the user to proceed for booking. In one embodiment, the task module 214 may be configured to handle one or more exceptions, when the users performs certain tasks from the group of tasks. The exceptions may comprise unavailability of some item, substituting certain item, unavailability of certain task for selected item and such like exceptions. In one embodiment, exceptions may also comprise managing or changing an item, deleting an item and such like.

In one embodiment, the determination module 215 may determine the impact of the task on each item of at least one electronic cart.

In one embodiment, the updation module 216, may dynamically update one or more items associated with the at least one electronic cart based on impact of the task.

In one embodiment, the data store 218 may be configured to store data offline. Moreover, in one embodiment, the system 101 may be configured to perform client side data storage in order to carry out actions faster without interacting with the server. In one embodiment, the data store 218 may store definitions and domains of the items and group of tasks and the exceptions when certain tasks are performed by the user. For example, the domains may be related to travel wherein the travel may be via flights, cruise, four-wheelers etc.

In one embodiment, a third party user such as an agent or a customer may be enabled to change the items or journey using simple user interface (UI) controls provided on the GUI comprising the journey planner screen.

The possible changes identified in a journey planner dashboard are below.

1. Change destination of the entire vacation:

The system 101 offers user interface (UI) controls to change the destination of the entire vacation. Once the user changes the destination, then the system 101 may notify for an availability search and available product or vacation package that will be displayed for the new destination. The user can select the required package and come back to journey planner screen with a latest destination.

2. Change duration of an item:

The system 101 allows the user to change the duration of an item (let's say, changing duration of the hotel). To change the duration either user can stretch the right end of the product icon in the user interface (UI) towards the required date column. Then, the system 101 may notify that a change has been done by the user for an item and the remaining items in the calendar may be auto aligned to the next calendar date depends on the changes date range. Once the items are re-aligned, then the entire line items will be displayed as invalid because an availability must be triggered for the latest date range to confirm the booking. The user will trigger for an availability from journey planner user interface and update the canvas with new item.

3. Massive deletion:

User can select multiple line items from the vacation at a time and delete those from the vacation in single click action. Then modify cart service will be invoked to update the line items to reflect the changes.

The implementation 100 offers an advanced user interface and controls to the user for doing the changes very quickly and notify the user for next immediate actions.

In one embodiment, an example illustrating change in destination of the entire vacation is as follows:

Example 1: The user had originally selected a 5 day package in Malaysia including a hotel stay, flights from and to his origin airport, land activities that match a "HISTORICAL" theme and transfers from the airport to the hotel. If the user changes the destination to Singapore, the system proposes packages that match the number of days and dates, the characteristics of the previously selected products and also tries to match the original budget.

In another embodiment, an example illustrating change in duration of an item is as follows:

Example 2: If the user has a booking consisting of a flight, hotel stay and transfers and the user changes the flight date to the previous day, the system proposes to change the check-in date of the hotel and also the transfer dates to match the new arrival date of the guests.

In one embodiment, the system 101 may also recommend available one or more items after determining the impact of the task on each item.

Figure 3:
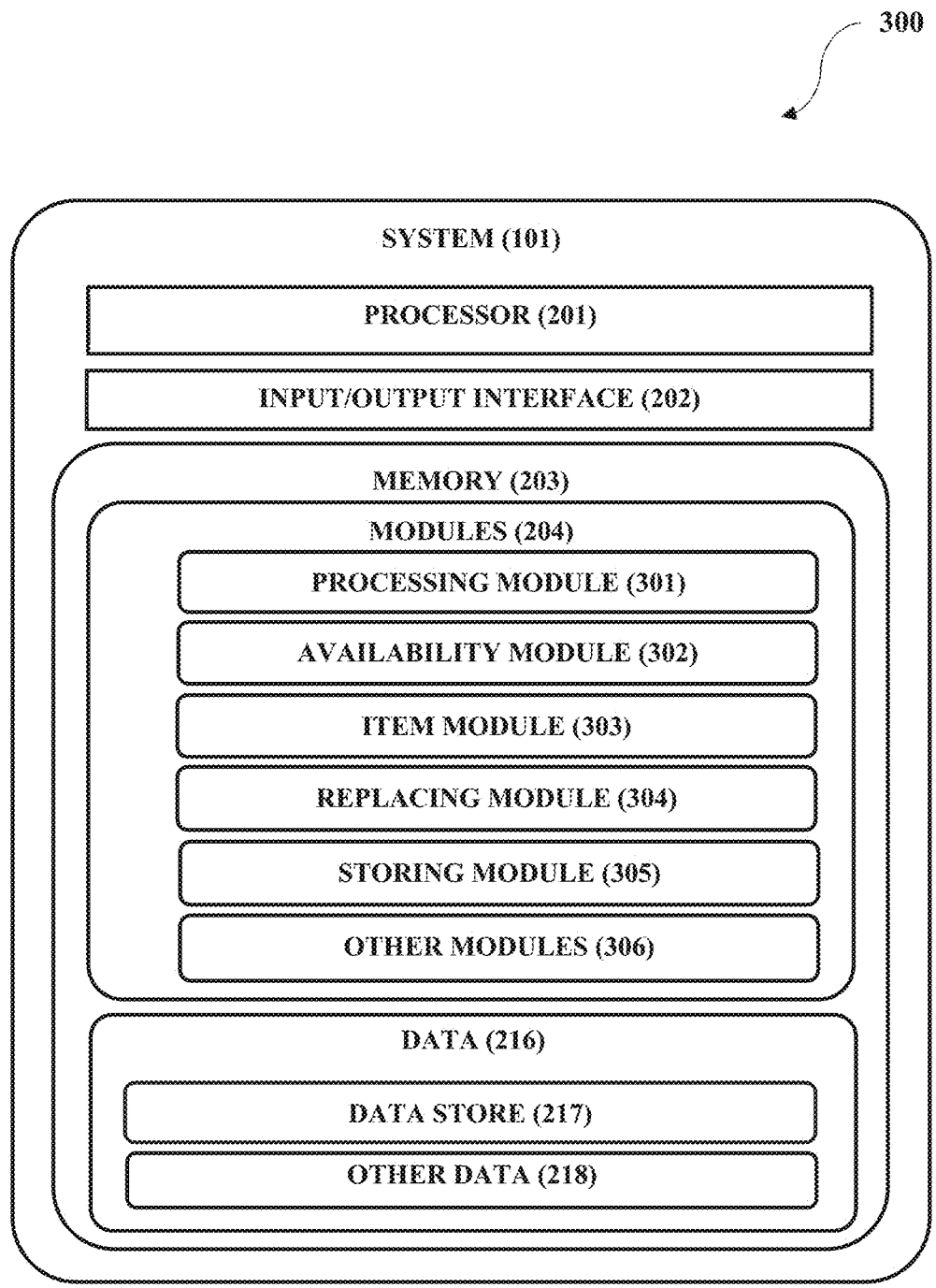
FIG. 3 illustrates, the system 101 and its components, in accordance with an embodiment of a present subject matter.

Referring to FIG. 3, components of the system 101, comprises at least one processor 201, an input/output (I/O) interface 202, a memory 203, modules 204 and data 213. In one embodiment, the modules 204 may comprise a processing module 301, an availability module 302, an item module 303, a replacing module 304, and a storing module 305 and other modules 306.

In one embodiment, the processing module 205 may process the raw user inputs based on Natural Language Processing (NLP) to determine the subset of items when the raw user inputs are in unstructured form. In a preferred embodiment, a journey plan may be created based on user inputs such a draft vacation plan comprising one or more items related to travel itinerary.

In one embodiment, the availability module 302 may determine an availability of one or more items associated with the travel itinerary.

In a preferred embodiment, the system 101 may determine the availability of the items associated with the journey plan from the prestored items in the system 101.

In one embodiment, the item module 303 may invoke one or more available items.

In one embodiment, the replacing module 304 may replace the raw inputs in unstructured form with the one or more travel itineraries associated with available items. In a preferred embodiment, the journey plan created may be replaced by the journey plans associated with available travel itinerary items.

In one embodiment, the storing module 305 may store the travel itinerary associated with the available items in the form of one or more electronic carts.

Thus, in a preferred embodiment, the system 101 may offer another feature by which the user can plan the journey in a calendar as a journey template version. Once the user sets the journey template, then the system 101 in the next phase replaces the product template with the actual product inventory by invoking a search availability service.

Figure 4:
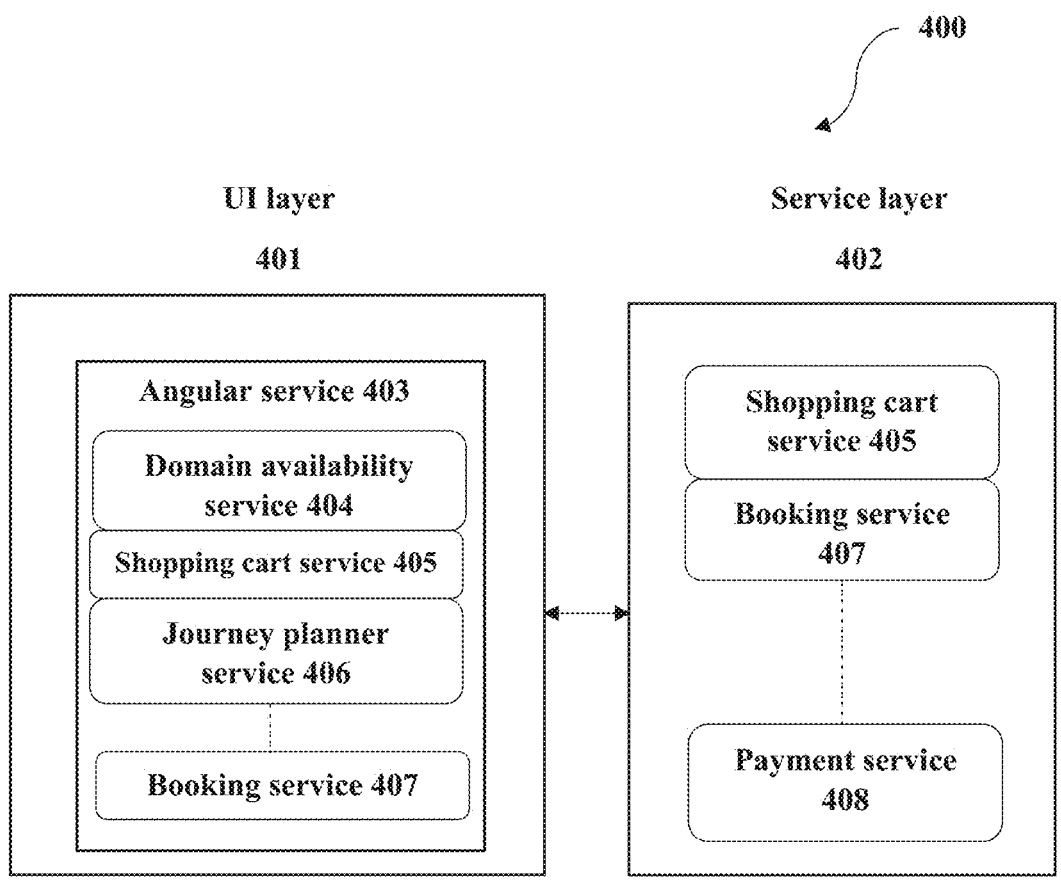
FIG. 4 illustrates, a client-server functional flow 400, in accordance to the present subject matter.

Referring now to FIG. 4, a client-server functional flow 400 is illustrated in accordance to the present subject matter. In one embodiment, the client-server functional flow 400 may comprise communication between a user interface (UI) layer 401 and a service layer 402. The user interface layer 401 may comprise a domain availability service 404, shopping cart service 405, a journey planner service 406, a booking service 407, etc. In one embodiment, once the system 101 replaces the whole product template with the actual inventory, then in the next step the system 101 stores the journey for booking procedure. The service layer 402 of the system 101 may call the shopping cart service 405 to add the journey plan with the available product.

The user interface (UI) layer 401 uses AngularJS framework which communicates with the service layer 402 wherein the service layer 402 is a web service end points exposed by the product. The user interface (UI) layer 401 may consists of an angular service registry in which all required service instances are registered. The domain availability service 404 may comprise different methods to invoke respective product availability service. The shopping cart service 405 may be responsible for invoking shopping cart service end points such as addCart, modifycart etc. The journey planner service 406 communicates with shopping cart services 405 to save the journey as an electronic cart, it also exposes API for other module to consume, for example if the user needs to see the items in the electronic cart in the form of a journey, then the system 101 invokes journey planner API which converts the input into JP data model to plot the same in the calendar view.

Figure 5:
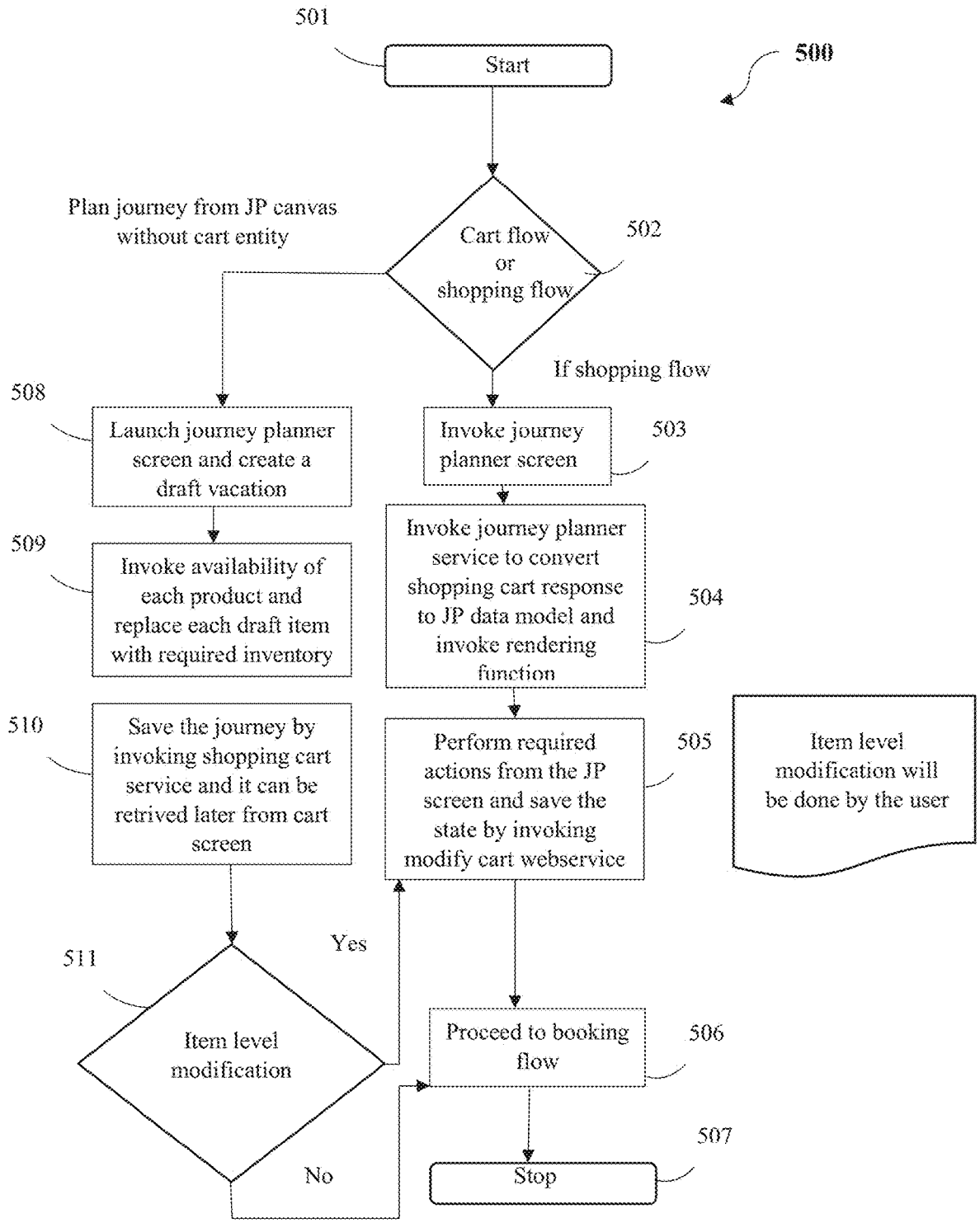
FIG. 5 illustrates, a step wise process 500 of a single unified system facilitating a collective travel itinerary, in accordance to the present subject matter.

Now referring to FIG. 5, a preferred embodiment comprising a step wise process 500 of a single unified system facilitating a collective travel itinerary, is illustrated in accordance to the present subject matter. At step 501, the system 101 may start the execution of instructions stored in memory 203. At step 502, the system 101 may identify whether the functional flow is from the electronic shopping cart or from the initial state without any cart.

In one embodiment, if the functional flow is identified from electronic shopping cart, the system 101 at step 503 may invoke a journey planner screen. Further, at step 504, the system 101 may invoke the journey planner service 406 to convert the electronic shopping cart response to a journey planner data model and invoke a rendering function to plot the items in the calendar view. At step 505, the system 101 may enable the user to perform actions from the journey planner (JP) screen and save or store the state by invoking a modify cart webservice. In one embodiment, the actions may comprise modifying, replacing, or deleting one or more items. Further, at step 506, the system 101 may execute further functions for performing a booking flow. At step 507, the system 101 may end the process.

In another embodiment, if the functional flow is identified from the initial state without any cart, the system 101 at step 508 may launch a journey planner screen and create a draft vacation. In other words, the system 101 may plan a journey directly from JP canvas without cart entity. Further, at step 509, the system 101 may invoke availability of each product and replace one or more draft items in the draft vacation with the required inventory. At step 510, the system 101 may store the journey by invoking the shopping cart service 405. At step 511, the system 101 may enable the user to perform item level modification. If the system 101 enables item level modification, the system may perform same actions as that of step 505. Further, at step 506, the system 101 may execute further functions for performing a booking flow. At step 507, the system 101 may end the process.

Figure 6:
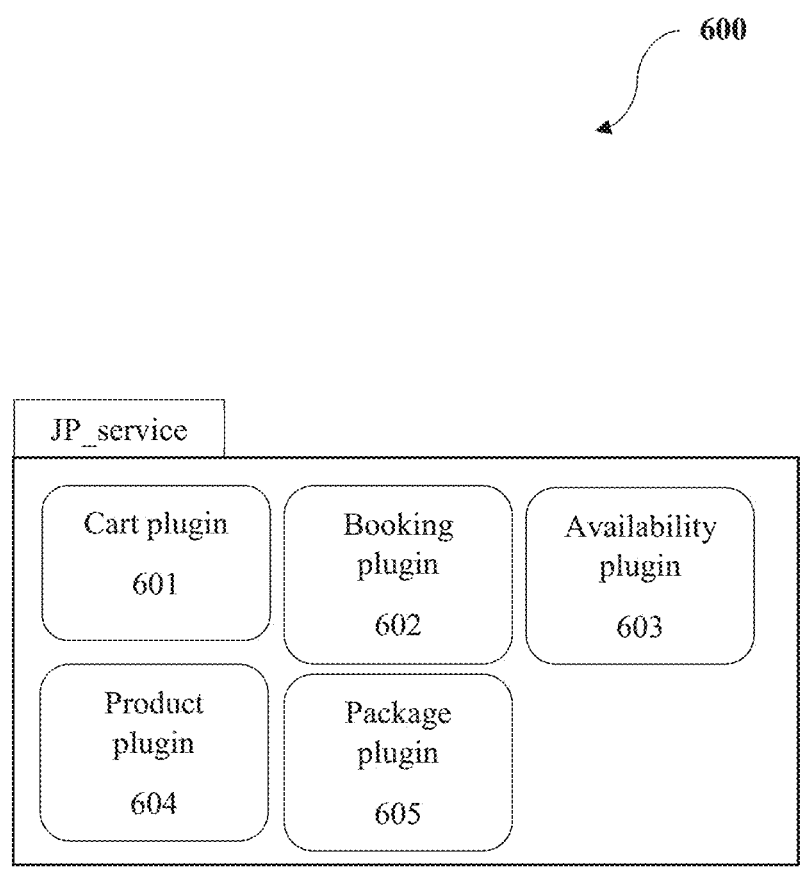
FIG. 6 illustrates, a structure of a journey planner service (JP service) 600, in accordance to the present subject matter.
Figure 9:
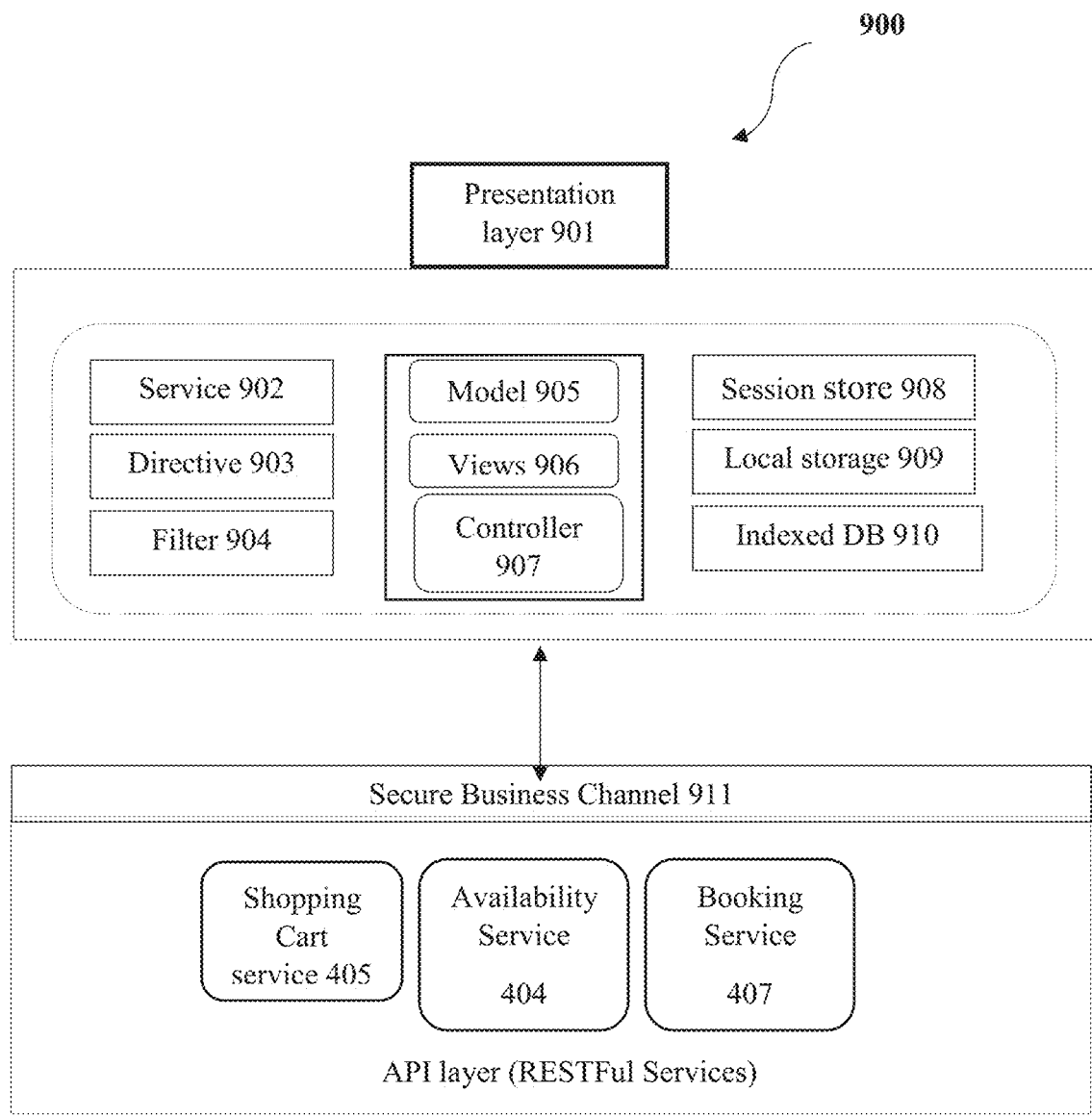
FIG. 9 illustrates, an architectural view 900 of communication between the presentation layer 901 and secure business channel 911, in accordance to the present subject matter.

Thus, the system 101 may store each journey as an electronic cart entity. Each electronic cart may be associated with an unique cart identifier (ID) and each electronic cart may be retrieved and plotted in the journey planner (JP) screen. Thus, there are no different versions for a single journey planner instead there are different carts created for different journey plans. Referring to FIG. 6 illustrates a structure of a journey planner service (JP service) 600, in accordance with an embodiment of the present disclosure. Further, referring to FIG. 9 illustrates an architectural view 900 of communication between the presentation layer 901 and secure business channel 911, in accordance with an embodiment of the present disclosure. The presentation layer 901 may comprise different views 906 maintained in a widget library for journey planner. For example, the views 906 may comprise calendar overview, per day detailing, week listing etc. In one embodiment, the presentation layer 901 may comprise an application interface model 905, herein after referred as API model. The API model 905 refers to the actual data input required for the journey planner component to show the items in the required view. Now referring to FIG. 6, if the user 103 launches the journey planner from electronic shopping cart screen then on click of the button, the system 101 may invoke a client side service known as Journey Planner service hereinafter referred as JP service 600. The JP service 600 is an angularJS service to convert electronic shopping cart data response to a journey planner data model and the JP service 600 may call the rendering algorithm to render the data in the journey planner UI to see the required view. The JP service 600 may comprise various modules such as cart plugin 601, booking plugin 602, availability plugin 603, product plugin 604, package plugin 605. The plugins are data conversion layer in the client side which converts respective data models to travel planner data model to render in the UI. In one embodiment, the presentation layer 901 of the system 101 may comprise an angularJS controller 907 which is a java script in which the DOM actions are performed by the user 103. For example, on clicking a button the system 101 may invoke a function or filtering data on selecting certain filter options 904 in the presentation layer etc. In one embodiment, the presentation layer 901 may use independent reusable services 902 or factories which can be injected to any scope using angular's dependency injection framework. For example, electronic shopping cart screen and journey planner service may be given as a dependency to the controller so that user can invoke the journey planner service 600 to perform a required actions. In one embodiment, the presentation layer 901 may comprise a directive 903 which offers a feature to create custom directives to change the behavior of a DOM (Document Object Model) element. There are three kinds of directives 903 in Angular:

Components—These are directives with a template.

Structural directives—These may change the DOM layout by adding and removing DOM elements.

Attribute directives—These change the appearance or behavior of an element, component, or another directive.

In one embodiment, the presentation layer 901 may comprise angular filters which are used to filter data based on certain filter criteria. For example, a custom filter may filter the collection of objects based on certain property. In a preferred embodiment, for the journey planner, filters may be used to filter the products plotted in the screen based on certain criteria, like show only packages or show only hotels etc.

Figure 7:
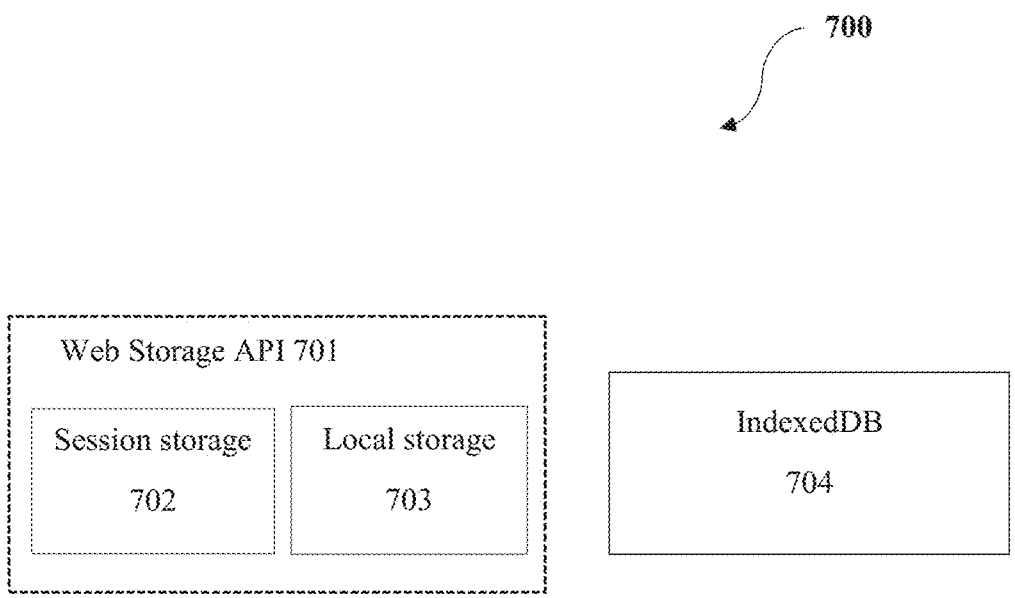
FIG. 7 illustrates, a client side data storage 700 and corresponding usage, in accordance to the present subject matter.

Referring now to FIG. 9 and FIG. 7, wherein the FIG. 7 illustrates a client side data storage 700 and corresponding usage. In one embodiment, one or more client storage application interface's (API's) such as indexedDB 704, local storage 703 and session storage 702 may be used to enable offline processing of data without hitting the server.

In a preferred embodiment, the system 101 for a journey planner exposes RESTFul web services which can be accessed through the security business channel 911. A channel authentication is required for accessing the services from an external source. For that the RESTful web services form the required security headers and makes a POST call to the restful web service end point.

It is very important for a web application to have an offline data processing to achieve better performance. Modern browsers have much easier, more efficient APIs for storing client side data.

In one embodiment, a web storage API 701 may be used. The web storage API 701 provides a very simple syntax for storing and retrieving smaller, data items consisting of a name and a corresponding value. This is useful when there is just a need to store some simple data, like basic user details, simple configuration data etc. A design approach of web storage API 701 comprises the session storage 702 and local storage 703. The session storage 702 stores the data for only one session. The data will be deleted when the user closes the browser tab or on session expiry. For the implementation 100, in one embodiment, may be an implementation of a journey planner wherein the master data are referred from the session store 702.

Service implementation: "sessionStorageService"

The local storage 703 stores the data with no expiration date. The data will not be deleted when the browser is closed, and will be available the next day, week, or year. The implementation 100 uses local storage service to get certain Meta data required for making the service call. For example (secure business channel name)

Service implementation: "localStorageService"

In one embodiment, the IndexedDB 704 provides the browser with a complete database system for storing complex data. This can be used for things from complete sets of customer records to even complex data types. IndexedDB 704 is a JavaScript-based object-oriented database. IndexedDB 704 enables storing and retrieval of objects that are indexed with a key; one need to specify the database schema, open a connection to database, and then retrieve and update data within a series of transactions. Operations performed using IndexedDB 704 are done asynchronously, so as not to block applications. IndexedDB 704 originally included both synchronous and asynchronous APIs.

Service implementation: "indexedDB Service"

In a preferred embodiment, the implementation 100 may utilize IndexedDB 704 API to store intermediate JP state for offline processing of data points. Since, the IndexedDB 704 offers comparatively large amount of data storage size it may require storing the initial response from the server 101 to make further service calls in later point of time.

Figure 8:
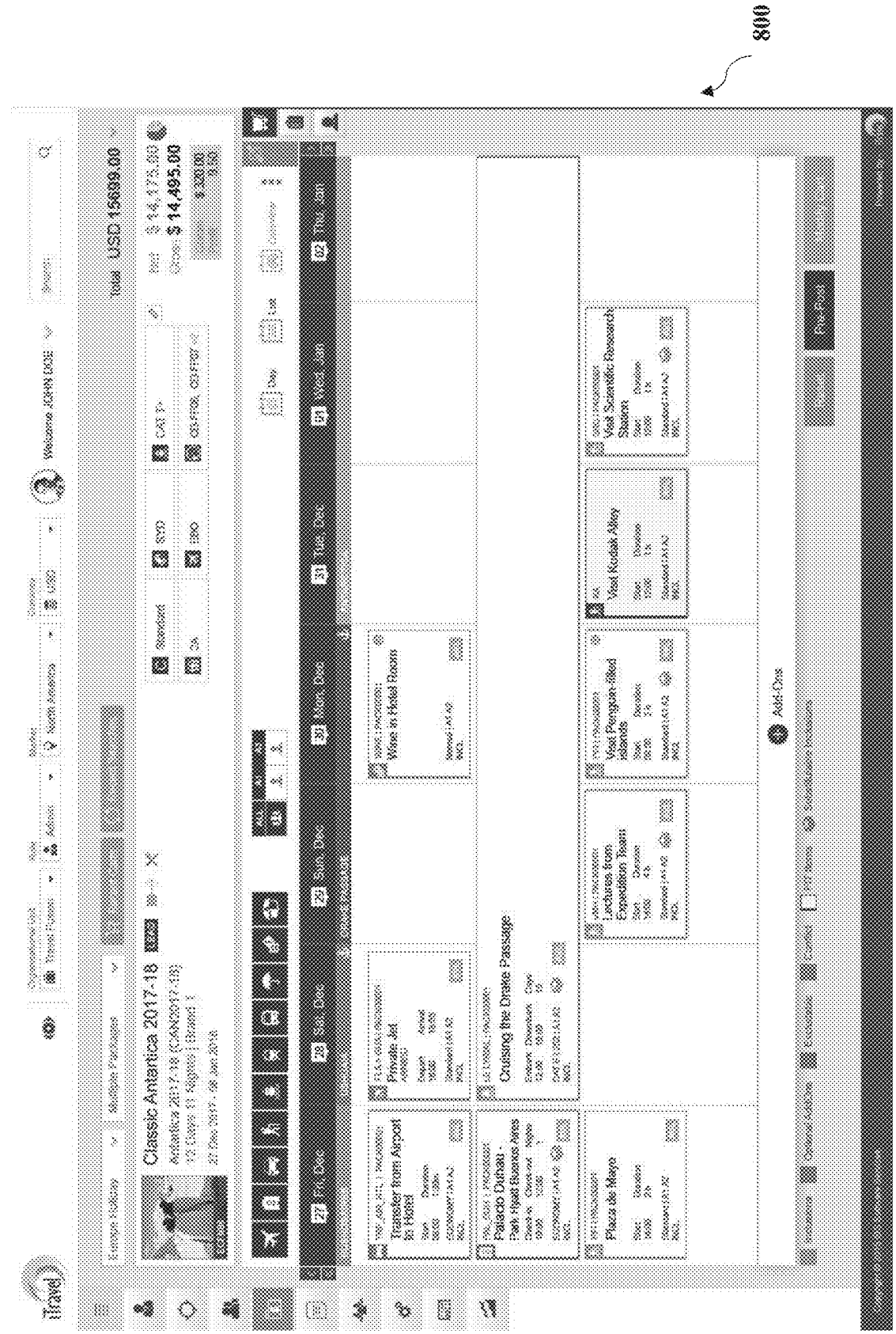
FIG. 8 illustrates, a graphical model 800 to visualize the system 101, in accordance to the present subject matter.

Referring now to FIG. 8, illustrates a graphical model 800 to visualize the system 101, in accordance with the present subject matter. In one embodiment, the system 101 allows the user 103 to create set of journey planner templates using the required products and save the template as a draft version in a document data base. Later on, the user 103 can retrieve the required template and replace or modify each product template with the actual inventory. Once the template becomes valid then it will be saved as an electronic cart entity in the application. Here the customization can be done by the user 103 for a particular template using journey planner user interface. In one embodiment, the system 101 allows the user to modify the line items available in a tour package. Customization may be done in such a way that user can remove some optional items from the tour package, change the duration of a product, change destination, add more item and upgrade the category of an item etc. Such changes may be notified by the system 101 and perform the required actions in the user interface (for example, update new price, update duration, update destination etc.)

In one embodiment, the process of displaying the calendar may be performed on the client side. There is a java script utility method available in the client side and it takes the date range or number of months as input and creates a list of date objects. These date objects will be iterated to show the user interface (UI) in the screen using HTML templates.

The system 101 maintains a product list in the order of start date. The product list is a collection of product objects and each object has its own property like duration, category, product type etc. These objects may be processed by the journey planner rendering algorithm which uses a template to show the products in the user interface (UI) based on the duration and product type.

Figure 10:
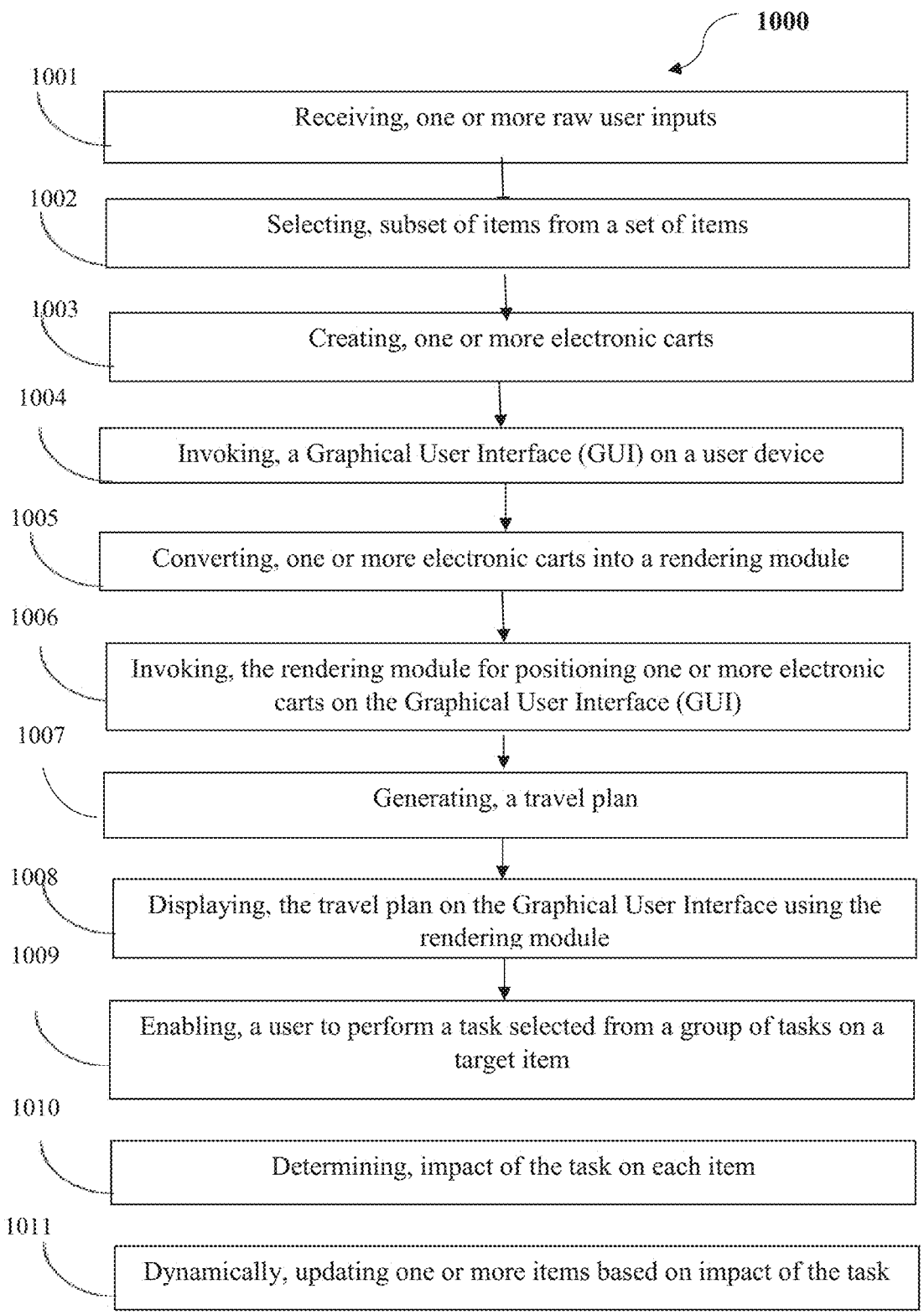
FIG. 10 illustrates, a method 1000 for dynamically updating a travel itinerary, in accordance to the present subject matter

Referring now to FIG. 10, a method 1000 for dynamically updating a travel itinerary is illustrated in accordance to the present subject matter. At step 1001, the data receiving module 205 may receive, raw user inputs, wherein the raw user inputs are in a structured form or an unstructured form.

At step 1002, the selection module 207 may select a subset of items from a set of items, based on the raw user inputs, when the raw user inputs are in the structured form.

At step 1003, the cart module 208 may create, one or more electronic carts wherein each cart is created based on one or more items from the subset of items, wherein each electronic cart is associated with a unique identifier, and wherein each electronic cart comprises the one or more items.

At step 1004, the GUI module 209 may invoke a Graphical User Interface (GUI) on an user device 103.

At step 1005, the data processing module 210 may convert, one or more electronic carts into a rendering module.

At step 1006, the rendering module 211 may be invoked for positioning one or more electronic carts on the Graphical User Interface (GUI).

At step 1007, the generation module 212 may generate, a travel itinerary, wherein the travel itinerary comprises at least one electronic cart selected from the one or more electronic carts.

At step 1008, the display module 213 may display, the travel itinerary on the Graphical User Interface using the rendering module, wherein one or more items associated with the at least one electronic cart is positioned on the GUI based on time and date associated with each item in the at least one electronic cart.

At step 1009, the task module 214 may enable, a user to perform a task selected from a group of tasks on a target item associated with the travel itinerary based on the unique identifiers associated with one or more electronic carts.

At step 1010, the determination module 215, may determine the impact of the task on each item of the at least one electronic cart.

At step 1011, the updation module 216, may dynamically update one or more items associated with the at least one electronic cart based on impact of the task.

Figure 11:
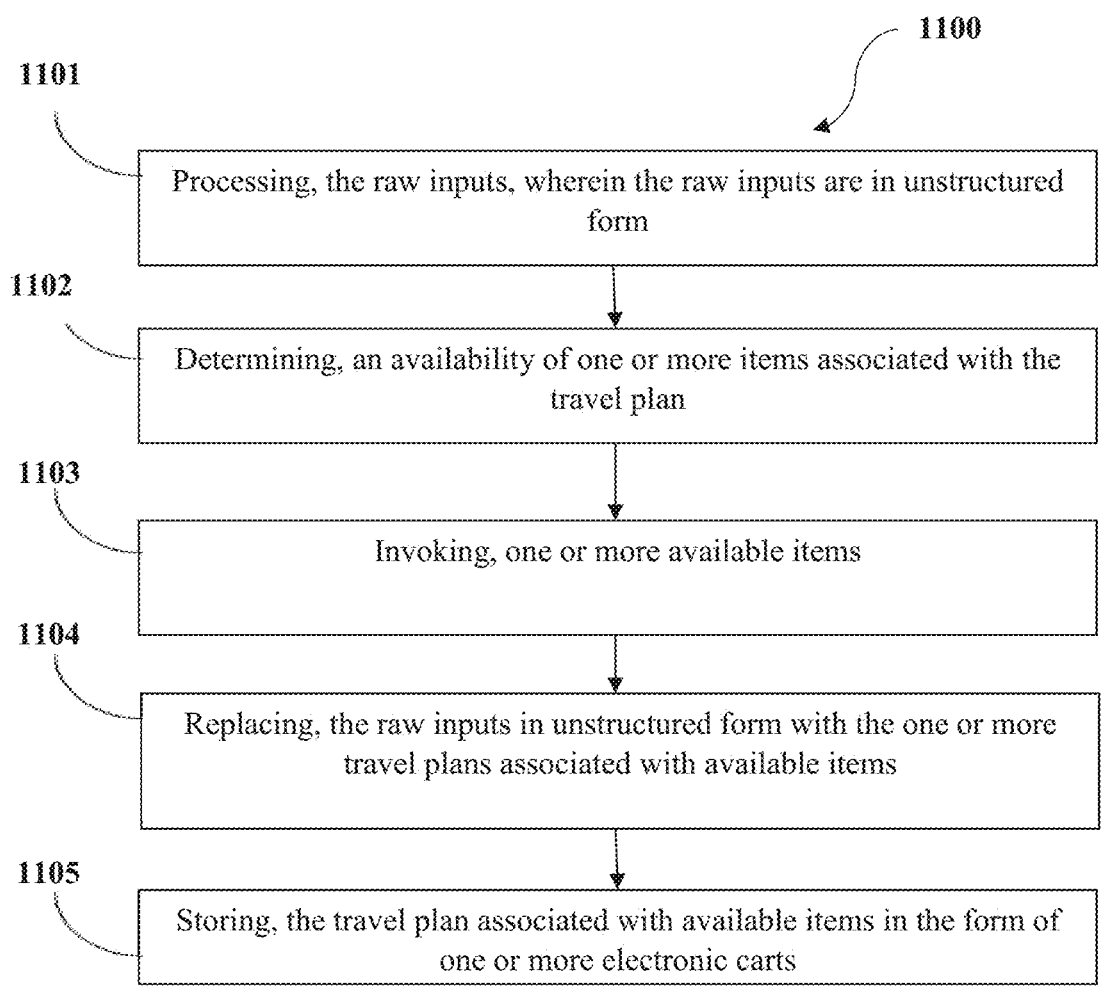
FIG. 11 illustrates, a method 1100 for processing raw inputs in received in an unstructured form, in accordance to present subject matter

Referring now to FIG. 11, a method 1100 for processing raw inputs received in an unstructured form is illustrated in accordance to present subject matter. At step 1101, the processing module 301, may process, the raw user inputs based on Natural Language Processing (NLP) to determine the subset of items when the raw user inputs are in unstructured form.

At step 1102, the availability module 302 may determine, an availability of one or more items associated with the travel itinerary.

At step 1103, the item module 303 may invoke, one or more available items.

At step 1104, the replacing module 304 replaces, the raw inputs in unstructured form with the one or more travel itineraries associated with available items.

At step 1105, the storing module 305 may store, the travel itinerary associated with available items in the form of one or more electronic carts.

Although implementations for a system and a method for dynamically updating a travel itinerary have been described in language specific to structural features and/or methods, it is to be understood that the appended claims are not necessarily limited to the specific features or methods described. Rather, the specific features and methods are disclosed as examples of implementations for dynamically updating a journey plan. The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

What is claimed is:

1. A system for dynamically updating a travel itinerary, the system comprising:
   a processor; and
   a memory coupled with the processor, wherein the processor is configured to execute a plurality of programmed instructions stored in the memory for:
      receiving, raw user inputs, wherein the raw user inputs are in a structured form or an unstructured form;
      selecting, a subset of items from a set of items, based on the raw user inputs, when the raw user inputs are in the structured form; creating, one or more electronic carts, wherein each cart is created based on one or more items from the subset of items, wherein each electronic cart is associated with a unique identifier, and wherein each electronic cart comprises the one or more items;
      invoking, a rendering module for positioning the one or more electronic carts on a Graphical User Interface (GUI);
      generating, a travel itinerary, wherein the travel itinerary comprises at least one electronic cart selected from the one or more electronic carts;
      displaying, the travel itinerary on the Graphical User Interface using the rendering module, wherein one or more items associated with the at least one electronic cart is positioned on the GUI based on time and date associated with each item in the at least one electronic cart;
      enabling, a user to perform a task, selected from a group of tasks, on a target item associated with the travel itinerary based on the unique identifiers associated with one or more electronic carts;
      determining, impact of the task on each item of the at least one electronic cart; and
      dynamically, updating one or more items associated with the at least one electronic cart based on impact of the task.

2. The system of claim 1, further configured to:
   process, the raw user inputs based on Natural Language Processing (NLP) to determine the subset of items when the raw user inputs are in unstructured form.

3. The system of claim 1, wherein the rendering module enables one or more formats for displaying the items with corresponding time and date on the Graphical User Interface, wherein one or more formats comprises a calendar view, per day detailing, week listing or such like formats.

4. The system of claim 1, wherein the one or more items comprise travel itinerary such as journey routes, means for travelling, lodging and boarding details, or site seeing details.

5. The system of claim 1, wherein the group of tasks comprise modifying, deleting, replacing, adding, and storing one or more items in the electronic cart based on user inputs.

6. The system of claim 5, wherein the group of tasks further comprise combining or separating two or more electronic carts.

7. The system of claim 1, wherein the unique identifier is an alphanumeric format.

8. The system of claim 1, wherein offline processing of data is enabled by one or more client storage application interface's (API's).

9. The system of claim 1, wherein one or more client storage API's comprise indexedDB, local storage and session storage, wherein indexedDB is a JavaScript-based object-oriented database.

10. A method for dynamically updating a travel itinerary, the method comprising:
    receiving, via a processor, raw user inputs, wherein the raw user inputs are in a structured form or an unstructured form;
    selecting, via the processor, a subset of items from a set of items based on the raw user inputs, when the raw user inputs are in the structured form;
    creating, via the processor, one or more electronic carts, wherein each cart is created based on one or more items from the subset of items, wherein each electronic cart is associated with a unique identifier, and wherein each electronic cart comprises the one or more items;

invoking, via the processor, a rendering module for positioning the one or more electronic carts on a Graphical User Interface (GUI);

generating, via the processor, a travel itinerary, wherein the travel itinerary comprises at least one electronic cart selected from the one or more electronic carts;

displaying, via the processor, the travel itinerary on the Graphical User Interface using the rendering module, wherein one or more items associated with the at least one electronic cart is positioned on the GUI based on time and date associated with each item in the at least one electronic cart;

enabling, via the processor, a user to perform a task, selected from a group of tasks, on a target item associated with the travel itinerary based on the unique identifiers associated with one or more electronic carts;

determining, via the processor, impact of the task on each item of the at least one electronic cart; and dynamically updating, via the processor, one or more items associated with the at least one electronic cart based on impact of the task.

11. The method of claim 10, further configured to:

process, the raw user inputs based on Natural Language Processing (NLP) to determine the subset of items when the raw user inputs are in unstructured form.

12. The method of claim 10, wherein the rendering module enables one or more formats for displaying the items with corresponding time and date on the Graphical User Interface, wherein one or more formats comprises a calendar view, per day detailing, week listing.

13. The method of claim 10, wherein one or more items comprise travel itinerary such as journey routes, means for travelling, lodging and boarding details, or site seeing details.

14. The method of claim 10, wherein the group of tasks comprise modifying, deleting, replacing, adding, and storing one or more items in the electronic cart based on user inputs.

15. The method of claim 14, wherein the group of tasks comprise combining or separating two or more electronic carts.

16. The method of claim 10, wherein the unique identifier comprises an alpha numeric format.

17. The method of claim 10, wherein offline processing of data is enabled by one or more client storage application interface's (API's).

18. The method of claim 10, wherein one or more client storage application interface's API's comprise indexedDB, local storage and session storage, wherein indexedDB is a JavaScript-based object-oriented database.

19. A non-transitory computer readable medium storing program for dynamically updating a travel itinerary, the program comprising programmed instructions for:

receiving raw user inputs, wherein the raw user inputs are in a structured form or an unstructured form;

selecting a subset of items from a set of items based on the raw user inputs, when the raw user inputs are in the structured form;

creating one or more electronic carts, wherein each cart is created based on one or more items from the subset of items, wherein each electronic cart is associated with a unique identifier, and wherein each electronic cart comprises the one or more items;

invoking a rendering module for positioning the one or more electronic carts on a Graphical User Interface (GUI);

generating a travel itinerary, wherein the travel itinerary comprises at least one electronic cart selected from the one or more electronic carts;

displaying the travel itinerary on the Graphical User Interface using the rendering module, wherein one or more items associated with the at least one electronic cart is positioned on the GUI based on time and date associated with each item in the at least one electronic cart;

enabling a user to perform a task, selected from a group of tasks, on a target item associated with the travel itinerary based on the unique identifiers associated with one or more electronic carts;

determining impact of the task on each item of the at least one electronic cart; and dynamically updating one or more items associated with the at least one electronic cart based on impact of the task.

* * * * *